US012465913B2

(12) United States Patent
Zhou et al.

(10) Patent No.: US 12,465,913 B2
(45) Date of Patent: Nov. 11, 2025

(54) DROPLET SORTING CHIP

(71) Applicant: Zhejiang Dapu Biotechnology Co., Ltd., Zhejiang (CN)

(72) Inventors: Hongbo Zhou, Zhejiang (CN); Ruyuan Song, Zhejiang (CN); Xiaonan Xu, Zhejiang (CN)

(73) Assignee: Zhejiang Dapu Biotechnology Co., Ltd., Jiaxing (CN)

( * ) Notice: Subject to any disclaimer, the term of this patent is extended or adjusted under 35 U.S.C. 154(b) by 810 days.

(21) Appl. No.: 17/734,050

(22) Filed: Apr. 30, 2022

(65) Prior Publication Data

US 2023/0285971 A1 Sep. 14, 2023

(30) Foreign Application Priority Data

Mar. 9, 2022 (CN) ......................... 202210223357.0
Mar. 9, 2022 (CN) ......................... 202210223392.2
Mar. 9, 2022 (CN) ......................... 202220494919.0
Mar. 9, 2022 (CN) ......................... 202220494926.0
Mar. 9, 2022 (CN) ......................... 202220494981.X
Mar. 9, 2022 (CN) ......................... 202220495614.1

(51) Int. Cl.
*B01L 3/00* (2006.01)

(52) U.S. Cl.
CPC ... *B01L 3/502761* (2013.01); *B01L 2200/027* (2013.01); *B01L 2200/0652* (2013.01); *B01L 2200/14* (2013.01); *B01L 2300/08* (2013.01); *B01L 2300/0832* (2013.01)

(58) Field of Classification Search
CPC ......... B01L 3/502761; B01L 2200/027; B01L 2200/0652; B01L 2200/14; B01L 2300/08; B01L 2300/0832; B01L 2200/141; B01L 2300/0645; B01L 2400/0424; B01L 3/502784
See application file for complete search history.

(56) References Cited

U.S. PATENT DOCUMENTS

2007/0026416 A1* 2/2007 Fuchs ............... B01L 3/502746
435/6.16
2022/0212188 A1* 7/2022 Chaput ............. B01L 3/502753
2022/0339630 A1* 10/2022 Deng ................ B01L 3/502784

* cited by examiner

*Primary Examiner* — Jennifer Wecker
*Assistant Examiner* — Britney N. Washington
(74) *Attorney, Agent, or Firm* — NZ Carr Law Office

(57) ABSTRACT

The present invention relates to the field of droplet microfluidics, particularly relates to a droplet sorting chip. The droplet sorting chip disclosed herein is provided with a cavity area, which can accommodate impurities such as fibers entering the droplet sorting chip, can effectively prevent clogging and collision and fusion of droplets caused by impurities, and ensure smooth droplet sorting.

17 Claims, 8 Drawing Sheets a b

DROPLET SORTING CHIP

FIELD OF THE INVENTION

The present invention relates to the field of droplet microfluidics, particularly to a droplet sorting chip.

BACKGROUND OF THE INVENTION

Microfluidic chip, also known as Lab-on-a-chip (Lab-on-a-chip), is a chip integrating a plurality of functions such as sample preparation, reaction and detection and separation of biological and chemical experiments on a chip with a size of several square centimeters, which can be called a miniature laboratory. With the advantages of miniaturization, integration and automation, microfluidic chips have great application potential in the fields of biological sample processing and rapid diagnosis of diseases, and great progress has been achieved in recent years.

Droplet microfluidics is an important branch of microfluidic platforms, a new technology for manipulating tiny volumes of liquids, namely droplets. Droplets are formed by one fluid within another immiscible carrier fluid, and the essence of which is emulsification. According to the different roles of the two immiscible fluids in the process of droplet generation, they are called continuous phase and dispersed phase (non-continuous phase) respectively; the dispersed phase is the fluid that is dispersed into droplets, and the continuous phase is the fluid acting as a droplet carrier. According to whether a monolayer emulsified dispersed phase belongs to the water phase or the oil phase, the droplets can be divided into O/W (oil-in-water) droplets and W/O (water-in-oil) droplets, wherein, O/W droplets refer to the oil droplets formed with the oil phase as the dispersed phase and the water phase as the continuous phase; W/O droplets refer to the water droplets formed with the water phase as the dispersed phase and the oil phase as the continuous phase.

Droplets have the advantages of small size, low diffusion, no cross-contamination, and fast reaction speed, and can be used for high-throughput analysis. In the actual application process, high-throughput droplet sorting is required; the volume of a single droplet is small, usually in the range of nanoliter to picoliter (10-9~10-12$^{L}$), correspondingly, the size of the chip used in droplet sorting is also small, especially the inlet, channel, etc. in the sorting chip, whose size is generally at the same level as the droplet. If there is some external environment or the liquid itself entering the microchannel contains impurities, the sorting efficiency and effect of the liquids will be affected remarkably.

SUMMARY OF THE INVENTION

In the present invention, it is found that tiny dust and fibers, etc. that enter the microchannel can easily lead to clogging, rupture or fusion of a droplet sorting chip. In addition, in the process of droplet sorting, slight changes in flow rate or the effect of other minor external forces will have a significant impact on the results of droplet sorting. How to accurately and effectively carry out the rapid sorting of droplets has always been a technical problem in the art. In order to carry out sorting of mixed droplets and obtain the target droplets accurately, quickly and automatically, the present invention provides a droplet sorting system that comprises a droplet sorting chip and/or a droplet sorting apparatus for controlling or accommodating the chip.

In a first aspect of the present invention, a droplet sorting chip is provided; the chip comprises a droplet inlet, a spaced oil phase inlet, a high-voltage sorting electrode, a sorting droplet outlet, a waste liquid outlet, and a channel connecting the inlets and outlets. Among them, the droplet inlet is used to enter a mixed solution, and the mixed solution comprises target droplets, non-target droplets and a continuous phase. The spaced oil phase inlet is used to inject the continuous phase so that the continuous phase drives the mixed solution to flow forward, and can adjust the distance of the droplets and control the flow rate of the droplets. The high-voltage sorting electrode is used to generate a non-uniform electric field, so that the target droplets are subjected to a dielectrophoretic force in the non-uniform electric field to change their flow direction and reach the sorting droplet outlet. The sorting droplet outlet is used to collect target droplets. The waste liquid outlet is used to collect non-target droplets.

In some embodiments, the chip further comprises an offset oil phase inlet for injecting the continuous phase, to prevent non-target droplets from flowing to the sorting droplet outlet by mistake.

In some embodiments, the chip further comprises a shield electrode, and the shield electrode is used to shield the non-uniform electric field generated by the high-voltage electrode, to prevent the non-uniform electric field from interfering with other areas in the non-target area.

In some embodiments, the chip comprises a glass substrate and a PDMS chip fixed thereon, the droplet inlet, the spaced oil phase inlet, the high-voltage sorting electrode, the sorting droplet outlet, the waste liquid outlet, the channel, the offset oil phase inlet, and the shield electrode are all arranged on the PDMS chip, for example, these tiny channels or pore structures are formed by engraving through a soft lithography process.

In a second aspect of the present invention, improvements are made to the droplet inlet of the droplet sorting chip.

During the design and use of the droplet sorting chip, the inventor has found that the droplet inlet of the existing droplet sorting chip is easily blocked by impurities such as dust and fibers, and meanwhile, these impurities are also likely to cause the droplets to rupture or fuse, which ultimately leads to the failure of the droplet sorting process or the reduction of droplet sorting efficiency and recovery rate.

In some embodiments, the chip of the present invention comprises a cavity area, which is a space for accommodating impurities, and can accommodate impurities such as dust and fibers, thereby avoiding the clogging problem of impurities. The size or number of cavity areas can be set according to the amount or size of impurities that may exist. The size of the cavity area should be sufficient to accommodate impurities, but it should not be too large, to reduce the droplet retention in the cavity area and the losses caused thereby.

In some embodiments, the chip comprises an injection port for injecting a mixed solution; the mixed solution comprises target droplets, non-target droplets and a continuous phase. Preferably, the cavity area is in communication with the injection port or is located downstream of the injection port, so that impurities can be directly retained by the cavity area, to prevent from entering other parts of the chip. Of course, the chip may also comprise a droplet generation unit, and the droplets generated by the droplet generation unit directly reach the sorting part, which does not require the injection port structure. At this time, the cavity area may also be provided with a cavity area to accommodate impurities that may enter the droplet generation unit.

In some embodiments, the chip comprises a sieve structure, and the sieve structure is located downstream of the injection port; after the solution enters the chip through the injection port, the sieve structure deflects the flow direction of impurities in the solution, to flow to the cavity area, and the liquid is sorted through the sieve structure. The reason for the deflection will be described below in detail.

At this time, if the mixed solution contains impurities, such as fibers and dust and there is no cavity area, these impurities will enter the area of the sieve structure, which will block the gaps or micropores or tiny gaps of the sieve structure, which may cause droplets unable to pass through the blocked area, and cause the droplets to break and fuse under the condition of no change in the pressure, or not to be sorted efficiently, which will also affect the subsequent sorting efficiency. Especially when the mixed solution contains rare or precious target droplets, this rupture or fusion will result in a decrease in the number of droplets, and thus the number of rare or precious droplets obtained is correspondingly reduced. The purpose of the sieve structure is to hope that the droplets are arranged continuously and the interval between the droplets remains relatively fixed, to facilitate the subsequent screening efficiency, but if the sieve structure is partially blocked, the droplets may be discontinuous, for example, in a section of the region, only the oil phase flows, but no droplets are included, which affects the subsequent screening efficiency.

Preferably, one end of the sieve structure close to the injection port is formed into an angular shape, and the periphery of the angular shape is the cavity area.

Preferably, the injection port is directly connected to the cavity area, and the connection is a smooth arrangement, so that impurities can reach the cavity area more easily.

In some embodiments, the sieve structure comprises cylinders and pores. The cylinders are arranged at regular intervals to form pore structures with the same interval. The size of cylinders and pore needs to be set according to the size of droplets; the droplets can pass through the pores but cannot pass through the cylinders. The cylinders and pores change the flow path of droplets, thereby changing the flow rate, and eventually make the droplets to flow out one by one at a certain interval. Impurities such as fibers are generally larger than droplets, especially if the length is longer than the pore size, it is difficult to enter the pores.

In some embodiments, the cavity area may be located at the top end of the chip in the depth direction, or may be located at the bottom end of the chip in the depth direction; the top end and bottom end here mean two ends of the chip in the vertical direction (for example, the direction perpendicular to the XY plane in FIG. 1), that is, compared with the on-chip channel or sieve structure, etc., the cavity area is in a lower and/or higher position in the depth direction of the chip. In other words, the height of the cavity area is greater than that of the sieve structure (FIG. 6*a*). When the cavity area is located at the top end of the chip in the depth direction, it can be used to accommodate impurities with low density and floating on the liquid surface (FIG. 6*b*); when the cavity area is located at the bottom end of the chip in the depth direction, it can be used to accommodate dense impurities located at the bottom of the liquid surface (FIG. 6*c*). At this time, the mixed solution entering the sieve structure reduces the entry of impurities, and the blocking problem of voids caused by impurities is avoided. Of course, the cavity area can also be located at the top end and bottom end of the chip in the depth direction and at the same level (FIG. 6*d*), for example, a cavity area is arranged downstream of the injection port and upstream of the sieve structure. The depth of the cavity area is greater than that of the sieve structure, the bottom end is deeper than the sieve structure, and the top end is higher than the sieve structure.

In some embodiments, the impurities may be other impurities such as glass fragments in addition to the fibers that may remain in the chip during the fabrication of the chip or the fibers and dust brought from the mixed solution.

In a third aspect of the present invention, the structure of the sorting channel of the droplet sorting chip is improved.

The inventor has found that most of the sorting channels of the existing droplet sorting chips are in a bifurcated "Y" shape, without an arrangement to prevent non-target droplets from entering the side of the sorting droplet outlet. For example, a sorting channel disclosed in the Chinese patent 202110644418.6 (CN113477282A) is in a Y shape; when target droplets are detected, a negative pressure is applied to change the movement direction of the target droplets to flow to a collection port; and when non-target droplets reach the sorting part, there is no force that hinders the flow of non-target droplets to the collection port side or the force that makes non-target droplets flow to the waste port side, the non-target droplets may also flow to the collection port, causing the sorting failure or the final target droplets to be mixed with a certain amount of non-target droplets, thus the sorting accuracy is low.

In some embodiments, the sorting channel of the present invention is a part of a channel (FIG. 1 and FIG. 7), and the sorting channel is composed of a main channel, a target channel, an offset channel, a waste liquid channel and a sorting part, and its shape is similar to the "X" shape, the main channel and offset channel are located upstream of the sorting channel, and the offset channel and waste liquid channel are located downstream of the sorting channel. The main channel is used for the passage of mixed solution, and the mixed solution comprises droplets and a continuous phase; the offset channel is used for fluid to pass through and generate lateral resistance, which can prevent non-target droplets from entering a target channel from the main channel after passing through the sorting part, thereby improving the accuracy of sorting. The fluid in the offset channel can be a gas or a liquid. For example, nitrogen gas is introduced from the offset channel, and the nitrogen gas is blown to the non-target droplets, making it flow to the waste liquid channel. Preferably, the fluid is liquid and the same as the continuous phase in the mixed solution.

It should be noted that the lateral resistance here should not be too large; otherwise, it may cause the droplets to collide with the channel wall and cause the droplets to break. If a negative pressure is used for sorting as described in Patent 202110644418.6, the resistance should be less than the pressure acting on the target droplets. The range of this resistance should be determined according to the droplets to be sorted, chip structure, sorting force (such as magnetic force, hydrodynamic force). The resistance can be changed by the direction and size of the offset channel, the flow rate of the fluid, etc.

In some embodiments, the main channel and the offset channel are parallel to each other and have the same size. It should be noted that the channel section refers to the cross-section of the channel in the vertical direction (for example, the Z-direction cross-section perpendicular to the XY plane in FIG. 1), which can be a circle, a semicircle, a rectangle or other irregular polygons. The mutual parallel here means that in the direction of the flow path, the main channel and the offset channel are parallel to each other, and the same size means that the size and shape of the cross-section of the two channels are the same.

In some embodiments, the fluid is a continuous phase, and the flow rate of the continuous phase in the offset channel is less than or equal to the flow rate of the mixed solution in the main channel.

In some embodiments, the offset channel and the main channel form a certain angle, and the angle is 0-90°.

In some embodiments, the chip further comprises a high-voltage sorting electrode for conducting electricity, generating a non-uniform electric field, and deflecting the target droplets to the target channel under the action of dielectrophoretic force.

In some embodiments, the chip comprises a spaced oil phase inlet for pumping a continuous phase to the main channel and an offset oil phase inlet for pumping fluid into the offset channel, preferably, the fluid is the same as the continuous phase.

In some embodiments, the fluid is the same as the continuous phase, and the chip comprises an oil phase inlet that pumps the continuous phase into the main channel and offset channel. The size of the flow rate in the two channels can be regulated by changing the size of the main channel and the offset channel.

Preferably, the dimensions of the target channel and the waste liquid channel are both larger than the dimensions of the main channel and the offset channel (the dimension refers to the size and shape of the vertical section of the channel).

Preferably, the target channel and the waste liquid channel are in communication with each other through a branch channel. The branch channel allows the continuous phase or the fluid to pass, but not droplets. The branch channel enables liquid exchange between the target channel and the waste liquid channel, thereby balancing the pressure of the two channels, preventing a large pressure difference between the two channels and interfering with the droplet sorting process. The number of the branch channels is greater than 1, and the number and size of the branch channels should be set according to specific conditions such as the size of the droplet sorting chip, the size of the sorted droplets and the dimension of the channel.

In a fourth aspect of the present invention, the droplet sorting chip provided by the present invention has a shield electrode for shielding electric field interference.

In some embodiments, the chip uses dielectrophoretic force to sort droplets, and at this time, a circle of shield electrodes can be arranged around the chip. "A circle" herein means a circle distributed along the periphery of each channel, micro-mechanism, etc. in the chip (shown in FIG. 1), which is connected to the protective ground wire of the apparatus during the use of the chip. This arrangement can shield the interfering electric field in each area, and the shield electrode is integrated into an integrated structure. When preparing, liquid metal or electrolyte solution is injected into an engraved channel, which is simple and convenient.

For example, in the patent 201910470013.8, two sorting electric fields are provided. In addition to generating non-uniform electric fields in the sorting part, the electric fields generated can also reach other parts of the chip, such as the inlets, and each channel. In these parts, there is also dielectrophoretic force acting on droplets, which can cause interference effects such as droplet collision and fusion, changes in flow rates. In addition, a particle sorting apparatus using dielectrophoretic force disclosed in the patent 201310102904.0 also has the problem of electric field interference. In the present invention, the shield electrode shields the electric field interference other than the sorting part, so that the droplet sorting process can be carried out more stably and smoothly.

Preferably, the shield electrode is a metal electrode.

In some embodiments, the metal electrode is formed by solidification of liquid metal.

In some embodiments, the metal electrode is composed of one or more of the following metals: indium, tin, and zinc.

In some embodiments, the metal electrode is an alloy, and the melting point of the alloy is lower than 200° C., preferably 40° C. to 80° C., so that the alloy is in a liquid state during the electrode preparation process. For example, when the metal electrode is an alloy of indium, tin and zinc, its melting point is between 40° C. and 80° C. When preparing a metal electrode, it is only necessary to heat the alloy to 80° C. to make it in a liquid state, and then pour into the an engraved electrode channel, and cool to form the metal electrode. This process can avoid the use of high temperature, reduce the heating cost and the risk of scalding, and shorten the heating and cooling time. In some embodiments, for example, in the first aspect of the present invention, the chip comprises a droplet inlet, an oil phase inlet, a high-voltage sorting electrode, a sorting droplet outlet, a waste liquid outlet, and a channel connecting the inlets and outlets, and the shield electrode is a circle of metal wire around these structures, with a depth greater than or equal to the channel.

In a fifth aspect of the present invention, a droplet sorting system is provided, and the system comprises a droplet sorting chip, a droplet sorting apparatus, and a computer system.

The droplet sorting apparatus comprises a monitoring module, and the monitoring module comprises an identification unit. The identification unit is used to collect information of sorted droplets and transmit the information to a computer system, and the computer system determines whether the sorted droplets are target droplets.

In some embodiments, the identification unit is an optical camera, and the optical camera is a CCD camera and/or a CMOS camera.

In some embodiments, the computer system comprises a grayscale comparison program, which can compare the grayscale information in the images collected by the optical camera, and determine whether the droplets are successfully sorted.

In some embodiments, the computer system comprises a deep learning model, and the deep learning model is used to identify the droplet information images obtained by the CCD camera or CMOS camera, so as to determine whether the droplets are correctly sorted.

In some embodiments, the deep learning model comprises VggNet, ResNet, YOLOv, etc., preferably YOLOv5.

In some embodiments, the identification unit has the functions of fluorescence excitation and collection. By providing excitation light to the sorted droplets, a certain intensity of fluorescence is generated for target droplets, and then the fluorescence can be collected to determine whether the droplets are correctly sorted.

In some embodiments, the identification unit collects the information of each sorted droplet and transmits the information to the computer system, and the computer system determines whether each sorted droplet is a correctly sorted droplet and counts the number of correctly sorted droplets and incorrectly sorted droplets. Here, the correctly sorted droplet means that the droplet entering the target channel is the same as the expected droplet, and the incorrectly sorted droplet means that the droplet entering the target channel is different from the expected one.

In some embodiments, when the computer system determines that the sorted droplets are not correctly sorted droplets or the cumulative number of incorrectly sorted droplets reaches a certain number or the cumulative incorrectly sorted droplets reaches a certain proportion, an early warning will be issued and/or an instruction is sent to the droplet sorting apparatus to stop the droplet sorting process. In the actual use process, the threshold for early warning and/or stopping the droplet sorting process can be set according to specific requirements. If the proportion of correctly sorted droplets in the droplets collected by the final sorting droplet outlet is high, for example, 100%, the droplet sorting process can be stopped as soon as incorrect sorting is found; if the requirements are low, the droplet sorting process can also be stopped after multiple sorting errors, for example, 100 times. Of course, the accumulative ratio of incorrectly sorted droplets can also be counted, that is, the ratio of the number of incorrectly sorted droplets to the total number of droplets passing through the target channel. When the ratio reaches a certain value, an early warning is issued and/or the droplet sorting process is stopped. For example, when the proportion of incorrectly sorted droplets is 1%, 2%, 3%, or 10%, the computer system issues an instruction to stop the droplet sorting process.

In some embodiments, the droplet sorting apparatus further comprises a chip module, a fluorescence module and an electrode driving module; the chip module is used to place the droplet sorting chip, the fluorescence module is used to excite and detect fluorescence, and the electrode driving module is used to provide high voltage to the droplet sorting chip.

In some embodiments, the droplet sorting chip is the droplet sorting chip provided in the first aspect of the present invention.

In some embodiments, the monitoring module further comprises a pressure monitoring unit and a flow rate monitoring unit, the pressure monitoring unit is used to monitor the pressure of the system, and the flow rate monitoring unit is used to monitor the flow rate of the system.

In a sixth aspect of the present invention, a droplet sorting method is provided.

In some embodiments, the method is carried out by the droplet sorting system of the fifth aspect of the present invention, which specifically comprises the following steps:

S1. The droplet sorting chip is placed in the chip module, and the sorting parameters are set through the computer system;

S2. The mixed solution enters the droplet sorting chip from the droplet inlet under the push of the sample pressure pump and forms a droplet flow arranged sequentially. Driven by the spaced oil pressure pump, the continuous phase is injected from the spaced oil phase inlet, and the continuous phase merges with the droplet flow, further making the droplets in the droplet flow to be arranged one by one in sequence at a certain interval, and driving the droplet flow to move forward continuously. At the same time, the continuous phase is injected from the offset oil phase inlet and enters the offset channel.

S3. When the droplets to be sorted arrive at the sorting part, the fluorescence module provides excitation light to illuminate the droplets to be sorted, detects a fluorescent signal, amplifies the fluorescent signal and converts into an electrical signal and transmits the signal to the computer system; the computer system determines whether the droplets to be sorted are target droplets through the received electrical signal, and if droplets are target droplets, the computer system outputs instructions to the electrode driving module, and the electrode driving module transmits high-voltage electricity to the high-voltage sorting electrode to generate a non-uniform electric field. Under the action of the non-uniform electric field, a dielectrophoretic force that acts on droplets to be sorted is generated, so that the droplets to be sorted are deflected and flow to the target channel; if droplets are non-target droplets, the computer system determines the droplets as non-target droplets, and does not issue an instruction to the electrode driving module, and the droplets to be sorted flow to the waste liquid channel. At this time, in the sorting part, the continuous phase entered from the offset channel can generate lateral resistance that prevents droplets to be sorted from entering the target channel, to prevent non-target droplets from flowing into the target channel by mistake.

S4. The identification unit collects the information of the sorted droplets in the target channel and transmits the information to the computer system, and the computer system judges whether the sorted droplets are correctly sorted.

In some embodiments, during droplet sorting, the computer system counts the information such as the number and proportion of correctly sorted droplets, and can display and feed back the operating status of the system.

The advantages of the present invention are as follows:

1. The present invention provides a droplet sorting chip. (1) The chip is provided with a cavity area for accommodating impurities, which can effectively reduce or avoid the problem of chip clogging; (2) the chip is provided with an anti-misflow structure, which improves the accuracy of sorting; (3) a circle of electrostatic shielding electrode is provided on the periphery of the chip, which can prevent electric field interference and make the chip work more stable during working.
2. The present invention provides a droplet sorting system. (1) Through the system, automatic droplet sorting can be carried out, which reduces manual operations; (2) the system is provided with a supervision mechanism, which can monitor the sorted droplets, increasing the stability and controllability of the system; (3) the system can count the number of sorted droplets or the proportion of target droplets without further statistics or confirmation; (4) the system can perform high-throughput droplet sorting and the accuracy of the droplet sorting is high.

Figure 1:
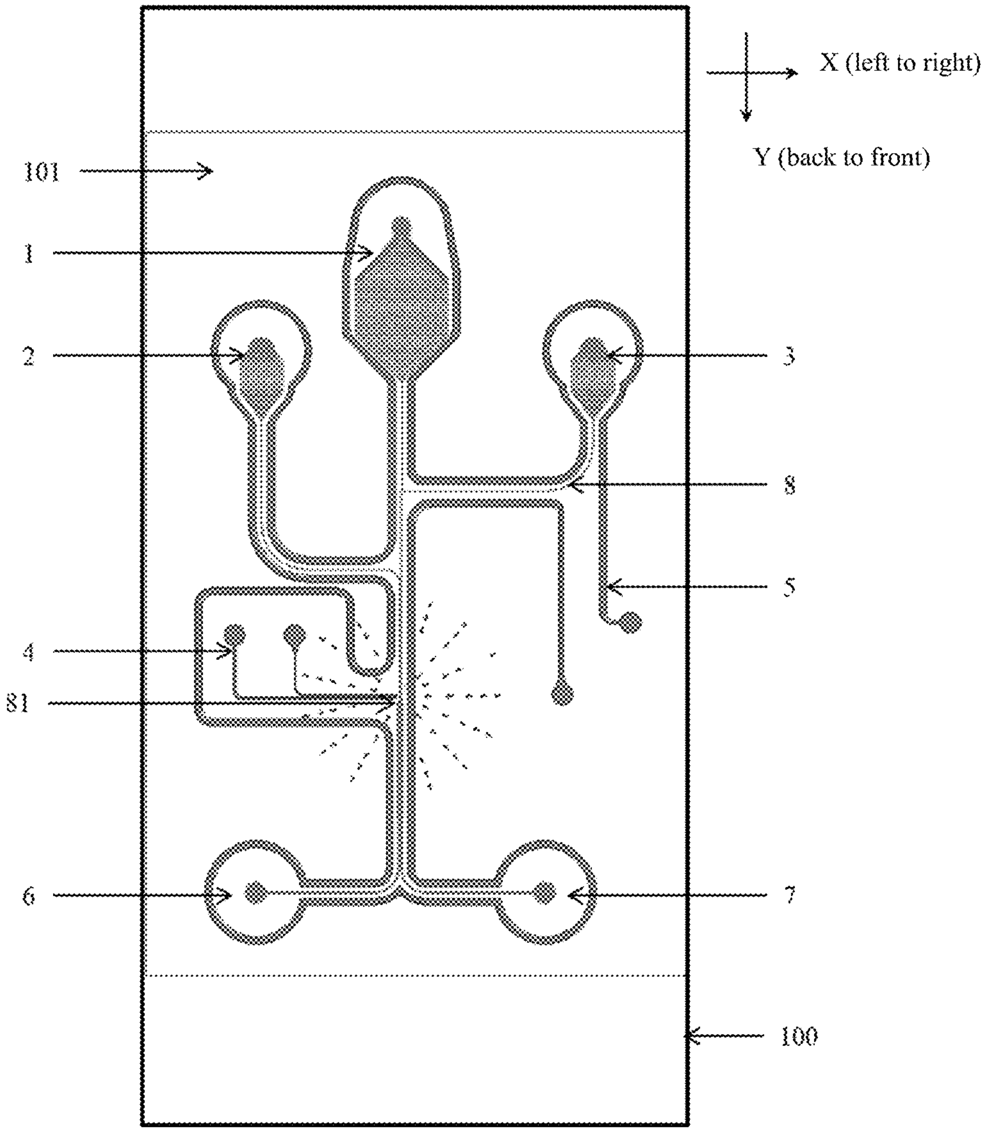
FIG. 1 is a structural representation of a plane structure of a droplet sorting chip.

In the figures: 1—droplet inlet, 2—offset oil phase inlet, 3—spaced oil phase inlet, 4—high—voltage sorting electrode, 5—shield electrode, 6—sorting droplet outlet, 7—waste liquid outlet, 8—channel, 9—impurity, 10—droplet, 11—injection port, 12—neck channel, 111—smooth arrangement, 13—regulating structure, 131—sieve structure, 1311—cylinder, 1312—pore, 1313—angular shape, 132—cavity area, 81—sorting channel, 811—main channel, 812—target channel, 813—offset channel, 814—waste liquid channel 815—sorting part, 815*a*—left side, 815*b*—right side, 816—branch channel, 100—glass substrate, 101—PDMS chip, 200—chip module, 300—fluorescence module, 400—pump driving module, 500—electrode driving module, 600—circuit module, 700-monitoring module.

DESCRIPTION

1. Mixed Solution, Target Droplets and Non-Target Droplets

In this application, mixed solutions all refer to solutions containing droplets and continuous phases. Wherein, droplets comprise target droplets and non-target droplets. Droplets can be one of W/O, O/W, W/O/W, O/W/O, or W/O and O/W/O, or O/W and W/O/W type. The continuous phase can be a single oil phase or water phase, or can be a plurality of mutually soluble liquid reagents. The target droplets refer to the required droplets, and in this application, the target droplets comprise droplets that can be excited to generate a certain intensity of fluorescence or droplets that wrap the targets when passing through the sorting part. Non-target droplets refer to droplets other than target droplets in the mixed solution. For example, in a solution containing W/O droplets (i.e., mixed solution) is prepared from a droplet generation chip, wherein, droplets that generate wrappage target cells, proteins, etc. (i.e., target droplets) when droplets are generated, or other droplets that can generate no wrappage or wrong wrappage (i.e., non-target droplets).

2. Droplets to be Sorted and Sorted Droplets

In this application, droplets to be sorted refer to the droplets to be sorted by the droplet sorting chip, which are the droplets in the mixed solution, or the droplets located in the front-end channel of the sorting part during droplet sorting, or the droplets located in the sorting part of the droplets. The sorted droplets refer to the droplets that have been sorted by the droplet sorting chip, and are the droplets that reach the target channel after sorting, or the droplets collected by the sorting droplet outlet, or the droplets that reach the waste liquid channel.

Detailed Description

The present invention will be further described below with reference to the accompanying drawings and embodiments. It should be noted that the embodiments are only a detailed description of the present invention, and are not intended to limit the protection scope of the present invention. All features disclosed in the embodiments of the present invention, or steps in all methods or processes disclosed, except mutually exclusive features and/or steps, can be combined in any manner, and are within the protection scope of the present invention. Any changes made by those skilled in the art without creative works based on the technical idea of the present invention should fall within the protection scope of the present invention. The technologies not involved in the present invention can be implemented by the prior art.

Example 1 Droplet Sorting Chip

As shown in FIG. 1, a droplet sorting chip is provided by the present invention, and the chip is composed of a glass substrate 100 and a PDMS chip 101 fixed thereon. The PDMS chip 131 is provided with a droplet inlet 1, a spaced oil phase inlet 3, an offset oil phase inlet 2, a high-voltage sorting electrode 4, a sorting droplet outlet 6, a waste liquid outlet 7, a channel 8 connecting the inlets and outlets, and a shield electrode 5.

The droplet inlet 1 is used for the entry of the mixed solution containing droplets. The spaced oil phase inlet 3 is used to inject the continuous phase so that the continuous phase drives the mixed solution to flow forward, and can adjust the spacing of the droplets and control the flow rate of the droplets. The offset oil phase inlet 2 is used to inject the continuous phase to prevent non-target droplets from flowing to the sorting droplet outlet by mistake. The high-voltage sorting electrode 4 is used to generate a non-uniform electric field, so that the target droplets are subjected to dielectrophoretic force in the non-uniform electric field to change their flow direction and reach the sorting droplet outlet 6. The sorting droplet outlet 6 is used to collect target droplets. The waste liquid outlet 7 is used to collect non-target droplets. The shield electrode 5 is used to shield the non-uniform electric field generated by the high voltage electrode, to prevent the non-uniform electric field from interfering with other areas in the non-target area.

Example 2 Droplet Inlet

Figure 2:
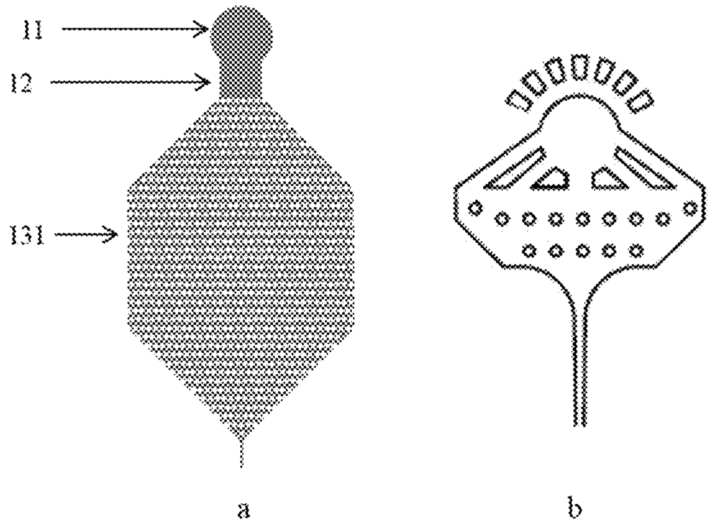
FIG. 2 is structural representation of two droplet inlets in the prior art.

At the droplet inlet 1, the inventor has found that the injection port 11 is connected to the regulating structure 13 through a segment of neck channel 12, and there is a sieve structure 131 in the regulating structure 13 (shown in FIG. 2*a*), and clogging of part or all of the chips are prone to occur during the process of droplet sorting, causing the sorting process unable to continue. The observation under the electron microscope found that impurities such as fibers block the neck channel 12, and there is a situation that impurities such as fibers enter the pore 1312 of the sieve structure 131 to cause clogging. In addition, for example, using the droplet chamber structure (FIG. 2*b*) shown in the Patent 202021628514.0 as the droplet inlet 1, there is still a clogging problem.

These impurities may come from the chip manufacturing process, for example, PDMS fibers produced by PDMS cutting, or impurities brought into the mixed solution, such as dust, tiny particles, and so on. In order to solve the above problems, the present invention provides a new design, which can effectively reduce the clogging of impurities on the chip, including the clogging at the inlets and the sieve structure 131 area, so that the droplets can enter the sieve structure 131 area more smoothly for orderly arrangement.

In order to provide an accommodating space for impurities such as fibers to prevent impurities from further entering the sorting chip, especially in the sieve structure 131 area of the regulating structure 13, a cavity area 132 is provided in the regulating structure 13, and the cavity area 132 is used to accommodate impurities such as fibers.

In some embodiments, the cavity area 132 is located at the inner periphery of the angular shape of the regulating structure 13, or is located at the periphery of the sieve structure 131 area. The cavity area 132 does not contain or does not substantially contain the sieve structure 131, which can be distributed on the periphery of the sieve structure 131 area and in communication with the sieve structure 131. When the mixed solution enters the sieve structure 131, the droplets pass through the sieve structure 131 area, thereby being arranged in an orderly manner. When there is a cavity area 132, the cavity area 132 is a blank space, and the sieve structure 131 area is in the shape of a sieve, the mixed solution will hit the sieve, and enter the sieve structure 131 area, and the resistance passing through the area is greater than the resistance of the mixed solution flowing into the sieve structure 131 area. Impurities in the solution, especially fiber impurities, will preferentially enter the cavity area and reduce the chance of entering the sieve structure 132 area, which may be one of the reasons for the cavity area 132 to be capable of accommodating impurities such as fibers and preventing these impurities from entering the sieve. Generally, the length of fiber impurities is greater than the diameter of the droplet. When entering the sieve structure 131 area, fibers will wrap around the cylinder 1311 in the sieve structure 131 area, and locate or block the pore 1312, which will hinder the flow of the liquid. In addition, the direct contact of the droplets with these fiber impurities entering the sieve structure 131 will cause the droplets to rupture or fuse, so that the number of target droplets obtained will be reduced in the subsequent sorting.

Figure 3:
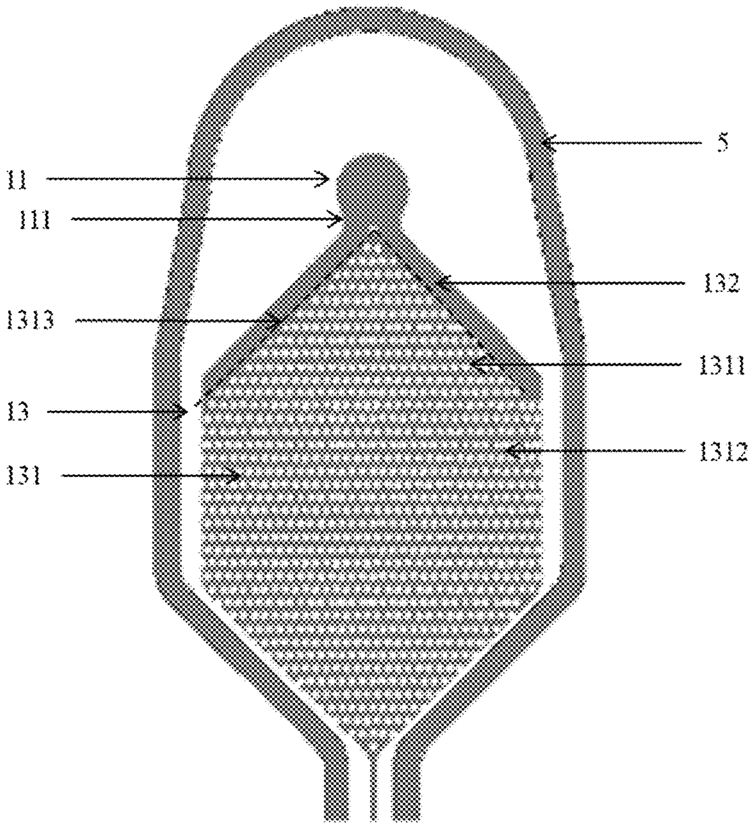
FIG. 3 is a structural representation of a droplet inlet provided in Example 2.

In some embodiments, the cavity area 132 for accommodating impurities is distributed on both sides of the inlet, and are located at the periphery of the sieve structure 131 area, or, the cavity area 132 for accommodating impurities is distributed at the inlet, generally with or without bifurcation at the inlet, the mixed solution flowing in from the inlet enters the sieve structure 131 area, and a part of which enters the cavity area 132 that accommodates impurities. As shown in FIG. 3, the cavity area 132 for accommodating impurities is located on the periphery of the sieve structure 131 area, respectively, and is distributed in the shape of "人" or "八", of course, it is feasible on only one side.

Figure 4:
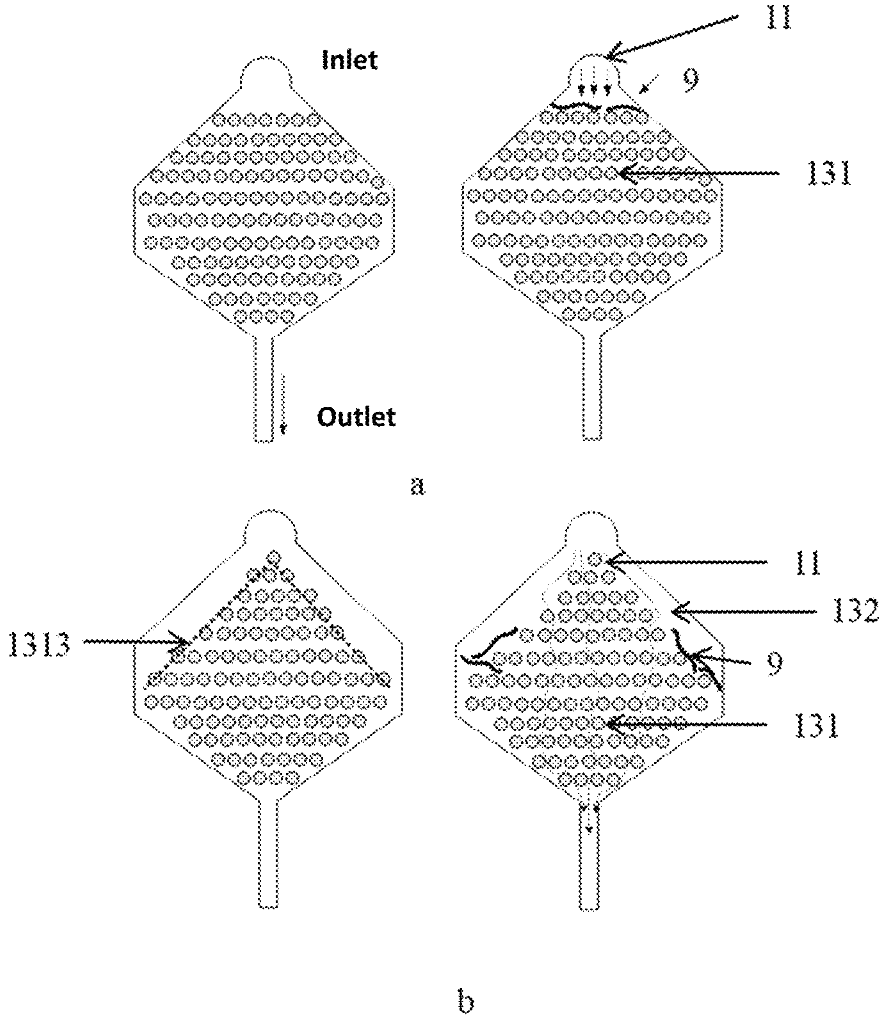
FIG. 4 shows a comparison when impurities enter a droplet inlet with a cavity structure (a) and without a cavity structure (b).
Figure 5:
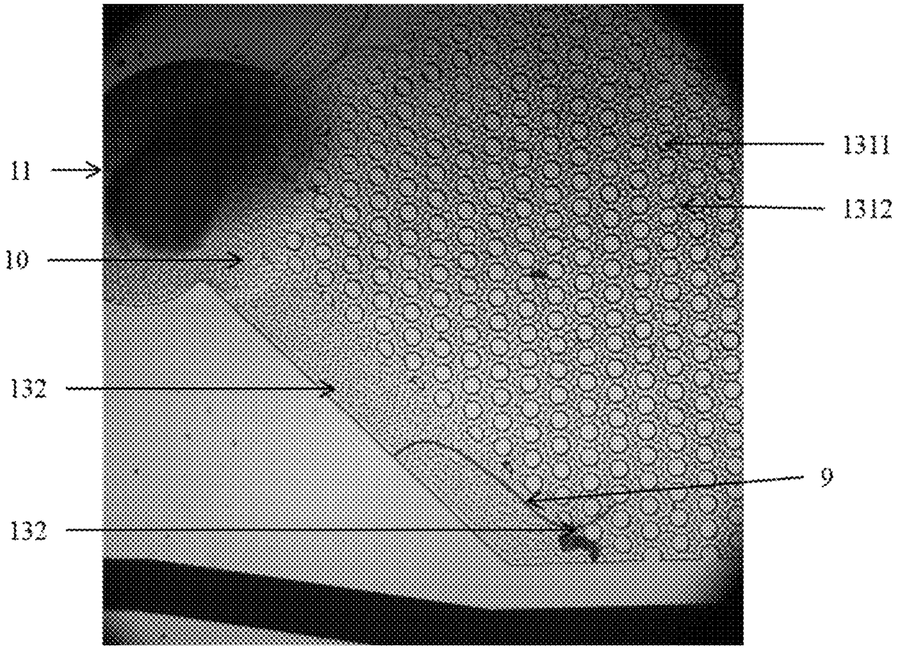
FIG. 5 is an electron micrograph of FIG. 3 when the droplet inlet structure is working.

In some embodiments, as shown in FIG. 3, the upper end of the sieve structure 131 also forms an angular shape 1313 in the horizontal direction (XY direction). The middle area between the edge of the angular shape 1313 and the edge of the angular shape of the regulating structure 13 is the cavity area 132. When the mixed solution enters the chip from the injection port 11, if there are fiber impurities in the solution, the length of the impurities is generally longer than that of the droplets, and impurities are easy to hit the cylinder 1311, thus flowing to the cavity area 132 on both sides and being retained, which can effectively avoid fiber impurities from entering the fiber structure 131. It should be noted that the cavity area 132 is in direct communication with the injection port 11 of the mixed solution, and a structure that can change the flow direction of the mixed solution is arranged at the injection port 11, so that the mixed solution or impurities therein will change the flow direction and flow to the cavity area 132 after hitting the structure, and then enter the sieve structure 131 from the cavity area 132. As shown in FIG. 4, when the impurity 9 in the mixed solution enters the droplet sorting chip, if there is no cavity area 132, impurities will be blocked at the inlets; if there is a "八"-shaped cavity area 132 between the angular shape 1313 and the angular shape edge of the regulating structure 13, the impurity 9 in the mixed solution hits the sharp corner of angular shape 1313, changing the flow direction from forward to sideways, after reaching the cavity area 132, impurities will be stuck in the cavity area 132 laterally, and cannot enter the sieve structure 131 any longer. The flow of the droplet 10 and the retention of impurities 9 in the structure are shown in FIG. 5 during actual use. In addition to the angular shape 1313 being a sharp triangular shape, the sharp corners of the angular shape 1313 can also be arc-shaped, which is more conducive to changing the flow direction of impurities. Of course, other structures that can change the flow direction, such as a small cuboid structure or a table-shaped structure, can also be arranged at the front end of the injection port 11. The cavity area 132 is preferably the above-mentioned "八"-shaped space, and may also be in other shapes such as a cuboid shape and a cylinder shape.

As shown in FIG. 3, the injection port 11 is directly connected to the regulating structure 13, which avoids the clogging of the neck channel 12. In other words, the mixed liquid entering from the inlet can directly enter the regulating structure 13 without passing through a similar buffer area, allowing the entering liquid to enter the sieve structure 131 area with a larger area or a larger cross-sectional area. In fact, some droplets can also enter the sieve structure 131 area and sort through the interface between the cavity area 132 and the sieve structure 131 area.

In some embodiments, the area where the regulating structure 13 is located is connected to the injection port 11 by a smooth arrangement 111 (FIG. 3) instead of a sharp angular shape, which can reduce the forward resistance and further avoid the clogging of the injection port 11. In particular, when the cavity area 132 is on both sides of the injection port 11, the mixed solution entering from the injection port 11 enters the regulating structure 13 through the smooth arrangement 111, which can avoid the collision between the mixed solution and the sharp corners, thereby reducing the resistance of the mixed solution and making it easier to flow to the downstream regulating structure 13; The frictional force of the droplets or impurities in contact with the inner wall of the chip at the periphery of the mixed solution will also be reduced when contacting with the smooth arrangement 111, and droplets or impurities easily flow to the cavity area 132 on both sides; in addition, the smooth arrangement 111 also makes the inlet of the cavity area 132 larger, which is easy to allow mixed solution to enter.

Figure 6:
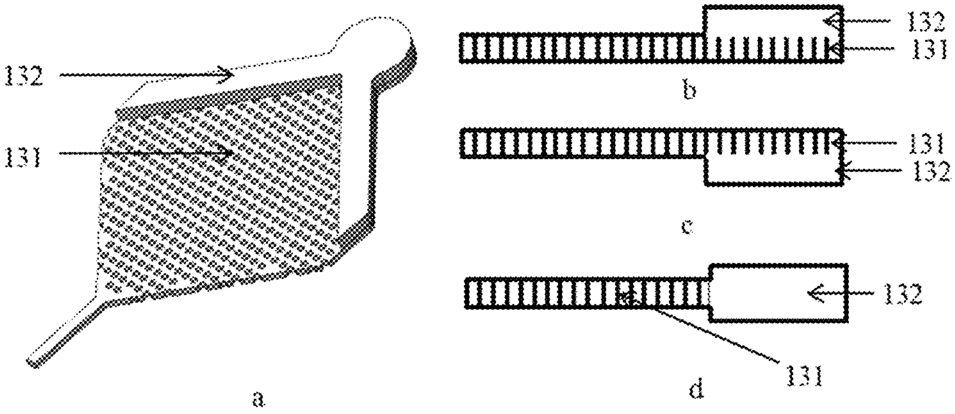
FIG. 6 is schematic diagram of the positional relationship between the cavity area and the sieve structure in a depth direction in Example 2.

The cavity area 132 is located at the top end and/or the bottom end of the droplet sorting chip in the depth direction, for example, the top end and/or the bottom end of the sieve structure 131 in the vertical direction, or the depth and/or height is greater than that of the sieve structure 131 (FIG. 6).

In some embodiments, the cavity area 132 is provided in the depth direction or the vertical direction (the direction perpendicular to the XY plane, denoted as the Z direction) where the regulating structure 13 is located at one end of the injection port 11. The cavity area 132 is located above the corresponding area on the periphery of the angular shape 1313 of the sieve structure 131. If there are fine impurities in the mixed solution, the density of which is lower than that of the liquid, for example, dust, and the impurities will float above the solution, and when they reach the cavity area 132, they can be retained by the cavity area 132, thereby avoiding entering the sieve structure 131 or entering the downstream channel.

In some embodiments, cavity area 132 is located below a corresponding area on the periphery of angular shape 1313 of sieve structure 131. If there are impurities with higher density than liquid in the mixed solution, such as fine glass fragments, the impurities will be located at the bottom of the solution, and when they reach the cavity area 132, they can be retained by the cavity area 132, thereby preventing the impurities from entering the sieve structure 131 or entering the downstream channel.

In some embodiments, the cavity area 132 may also be located directly at the top end or bottom end of the sieve structure 131 in the depth direction, which may be located at the top end or bottom end of the upstream, middle or downstream regions of the sieve structure 131. At this time, the mixed solution first reaches the sieve structure 131; however, since the impurities with higher or lower density float on the top or bottom of the solution, the impurities with higher density will sink at the bottom end and retain in the cavity area 132; when the sieve structure 131 is filled with the solution, the impurities with lower density will float on the top end, reach the cavity area 132 and be retained. This arrangement is especially suitable for the impurities with large density or small density and relatively small volume, for example, dust, fine glass or metal particles, etc. Preferably, the cavity area 132 is located at the top end or the bottom end of the upstream area of the sieve structure 131. At this time, the cavity area 132 is located upstream of the mixed solution flow path, and the impurities therein can reach the cavity area 132 earlier and be retained, to prevent impurities from flowing more places or retaining longer in the sieve structure 131, to disturb more droplets. In some embodiments, the cavity area 132 has a depth or height greater than that of sieve structure 131, the cavity area 132 is located at the periphery of sieve structure 131, and may have a greater depth and/or height than that of the sieve structure 131. At this time, after the mixed solution enters the chip from the injection hole, it is easy to reach the cavity area 132 first. At this time, impurities in the solution, including fibers or dust floating at the top end of the solution or fine glass sinking at the bottom end of the solution, are all retained by the cavity area 132.

Example 3 Sorting Channel

1. Sorting Channel and Improvement

Figure 7:
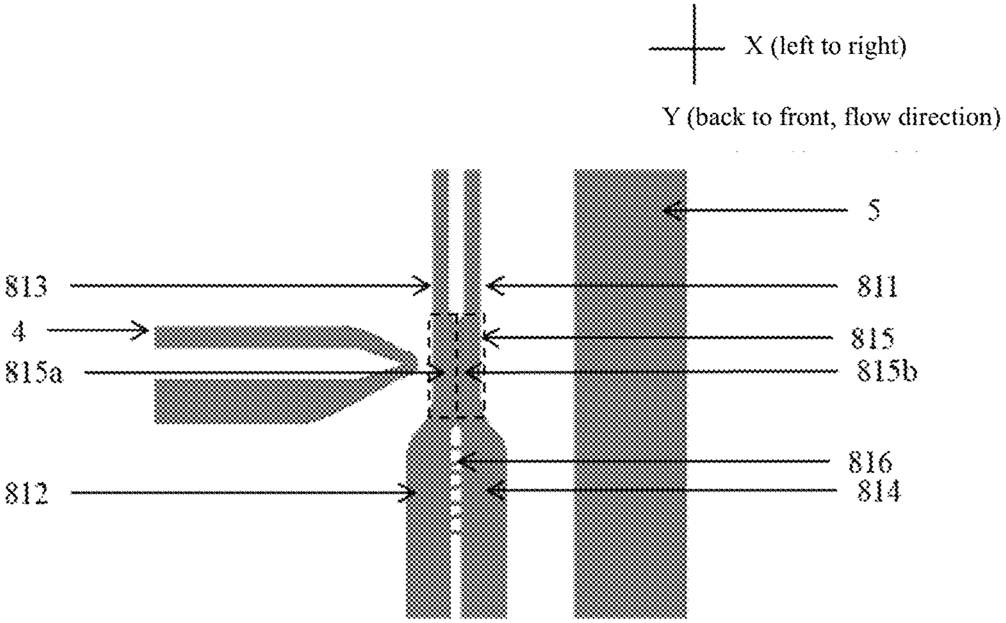
FIG. 7 is a structural representation of a sorting channel provide in Example 3.

A sorting channel 81 is shown in FIG. 7. The sorting channel 81 is composed of a main channel 811, a target channel 812, an offset channel 813, a waste liquid channel 814 and a sorting part 815 at the intersection of the channels.

The droplets to be sorted arranged in sequence flow forward in the main channel 811 driven by the spaced oil phase. When passing through the detector, if the detector detects that the droplets to be sorted are target droplets, a voltage is applied through a high-voltage sorting electrode 4 to generate a dielectrophoretic force, which deflects the droplets to be sorted into the target channel 812 at the sorting part 815. If the droplets to be sorted are non-target droplets, the droplets flow to the waste liquid channel 814 driven by the spaced oil phase. At the same time, the offset oil phase enters the offset channel 813 from the offset oil phase inlet 2, and further flows into the target channel 812. This setting can generate a certain lateral resistance at the sorting part 815 to prevent non-target droplets from flowing into the target channel 812 by mistake. The resistance direction is from the offset channel 813 to the main channel 812 side, that is, from left to right here. It should be noted that the resistance should not be too large, which may cause the droplets to collide with the channel wall to the right, resulting in rupture or deformation, and when the resistance is greater than the dielectrophoretic force, the target droplets may not be deflected when entering.

(1) In some embodiments, the offset oil phase and the spaced oil phase are the same as the continuous phase. For example, when sorting fluorinated oil-type W/O droplets, both the offset oil phase and the spaced oil phase are fluorinated oil. The main channel 811, target channel 812, offset channel 813 and waste liquid channel 814 are all oval channels. The dimensions of main channel 811 and offset channel 813 (that is, the shape and area of the channel section in the vertical direction, the area is denoted as R1) are the same and parallel to each other; the dimensions of target channel 812 and waste liquid channel 814 are the same (area of the channel section in the vertical direction is denoted as R2) and parallel to each other, and R2 is greater than R1. The flow rate of fluorinated oil in the main channel 811 is less than or equal to the flow rate of the offset channel 813, which can effectively prevent non-target droplets from entering the target channel 812 by mistake.

① When the fluorinated oil flow rate in the offset channel 813 is smaller than that of the main channel 811, the flow rate of the sorting part 815 on the left side 815*a* is smaller than the flow rate on the right side 815*b*. According to the Bernoulli effect, the pressure at the position with a larger flow rate is smaller, and the pressure at the position with a smaller flow rate is larger. Therefore, the pressure on the left side 815*a* is greater than that on the right side 815*b*, resulting in a left-to-right force (i.e., lateral resistance), to prevent the non-target droplets on the right side 815*b* from reaching the left side 815*a*, thereby entering the target channel 812.

② When the fluorinated oil flow rate in the offset channel 813 is equal to that of the main channel 811, the pressure on the left side 815*a* is equal to that on the right side 815*b*, and the non-target droplets continue to flow forward from the main channel 811, and reach the waste liquid channel 814 after passing through the sorting part. At the same time, when the non-target droplets flow from the area on the right side 815*b* to that on the left side 815*a*, since the fluorinated oil from the offset channel 813 passes through the 815*a* area, the non-target droplets will be subjected to the resistance from the offset channel 813 side to the main channel 811 side (i.e., lateral resistance from left to right), preventing the flow of non-target droplets to the left side 815*a*.

When R2 is greater than R1, the flow rate of the fluid in target channel 812 and waste liquid channel 814 is smaller than that of main channel 811 and offset channel 813, which can reduce the influence of the front-end resistance of sorting part 815 on the flow rate of droplets and avoid possible interference with the droplet sorting process.

In some embodiments, a branch channel 816 communicated between the target channel 812 and the waste liquid channel 814 is provided, and the branch channel 816 allows liquid to pass through, but does not allow droplets to pass through. Through the branch channel 816, the liquid in target channel 812 and in the waste liquid channel 814 can be exchanged, so that the pressure in the target channel 812 is similar to that in the waste liquid channel 814, to prevent excessive pressure in target access 812 from hindering the entry of target droplets or prevent excessive pressure in the waste liquid channel 814 from hindering the entry of non-target droplets.

Figure 8:
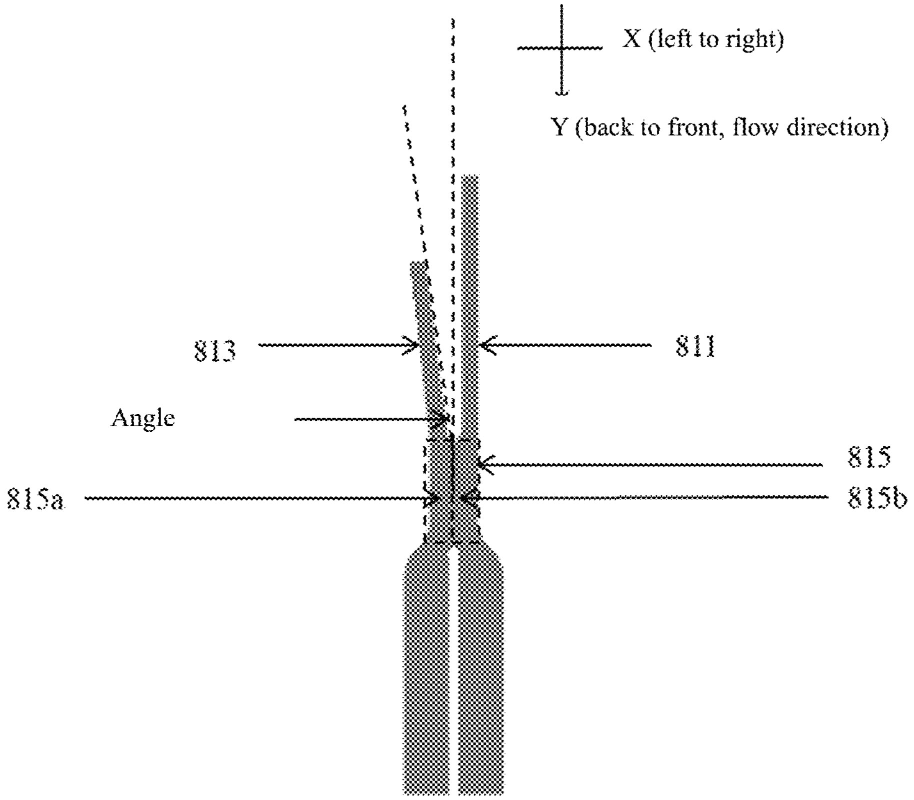
FIG. 8 is a structural representation of another sorting channel provide in Example 3.

(2) As shown in FIG. 8, the offset channel 813 and the main channel 811 form a certain angle, and the angle is 0~90°. The offset oil phase entering from the offset channel 813 will generate momentum from left to right (i.e., lateral resistance), which can prevent the non-target droplets in the main channel 811 from entering the left side target channel by mistake. Similarly, the momentum should not be too large, that is, the flow rate of the offset oil phase in the offset channel 813 should be controlled within a reasonable range: ① When the angle is large, the flow rate of the offset oil phase should be small; when the angle is small, the flow rate of the offset oil phase should be larger. ② At the same time, the flow rate is related to the flow rate of the mixed solution in the main channel 811. The larger the flow rate of the mixed solution, the larger the flow rate; the smaller the flow rate of the mixed solution, the smaller the flow rate. ③ In addition, the dielectrophoretic force and the Bernoulli effect also need to be considered.

In general, ① When the non-target droplets pass through sorting part 815, the force on the XY plane to which they are subjected is divided into the force in the flow direction, and the force perpendicular to the flow direction. The direction of the force perpendicular to the flow direction is from the side of the offset channel 813 to the side of the main channel 811 (i.e., the lateral resistance, the force from left to right in FIG. 7 and FIG. 8), so that the non-target droplets will not be offset from the right side **815*b* to the left side 815*a* within the distance passing through the sorting part 815. ② When the target droplets pass through the sorting part 815, the target droplets are not only subjected to the force received by the non-target droplets, but also subjected to the dielectrophoretic force. The resultant force is opposite to the direction of lateral resistance in the direction perpendicular to the flow direction, and can make the target droplets to shift from the right side 815*b* to the left side 815*a* within the distance passing through the sorting part 815, thereby further entering the target channel 812**.

(3) The chip in FIG. 1 is provided with two oil phase inlets, namely the spaced oil phase inlet 3 and the offset oil phase inlet 2, which control the liquid flow rate in the offset channel 813 and the main channel 811 respectively. The two inlets need to be driven by power respectively, for example, by a pump. There will be errors in the power drive, which will lead to a deviation between the actual flow rate in the channel and the set flow rate. The tube of the droplet sorting chip is very small, and a slight deviation will affect the sorting results. In addition, two drives also increase the cost. Therefore, the present invention provides another droplet sorting chip. Both the offset oil phase and the spaced oil phase of the chip enter from the same inlet (oil phase inlet). The flow rates of the offset channel 813 and the main channel 811 can be changed by adjusting the dimensions of the offset channel 813 (area Ra of the channel section in the vertical direction) and the main channel 811 (area Rb of the channel section in the vertical direction). When Ra is equal to Rb, the flow rates of the two channels are equal; when Ra is >Rb, the flow rate of the offset channel 813 is less than the flow rate of the main channel 811; when Ra is <Rb, the flow rate of the offset channel 813 is greater than the flow rate of the main channel 811. It should be noted that, after entering from the injection port 11, the mixed solution is mixed with the oil phase entering from oil phase inlet 100 into main channel 811, and the mixed solution may have an impact on the flow rate. Depending on the injection speed of the mixed solution and the droplet density, etc., this impact may be negligible, and may also need to be considered, so that the inner diameter of the main channel 811 needs to be adjusted accordingly.

2. Droplet Sorting Test

Figure 9:
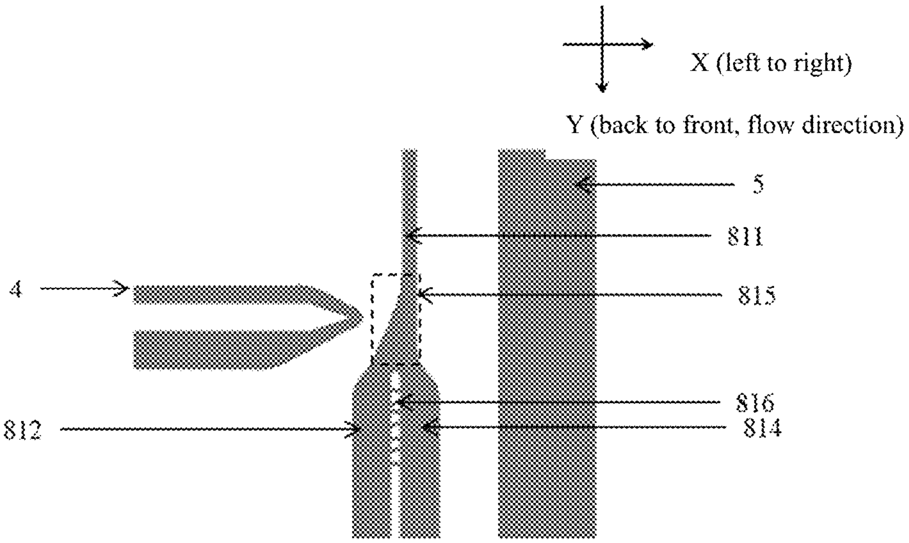
FIG. 9 is a "Y-shaped" sorting channel.

The inventors use the "X" type sorting channel (test group) of FIG. 7 and the "Y" type sorting channel (control group) of FIG. 9 to conduct a droplet sorting test respectively.

Test group: The width of the main channel 811 and the offset channel 813 in FIG. 7 is 54 μm, the depth is 60 μm, the horizontal cross-section of the sorting part 815 is a rectangle of 148 μm×60 μm, the width of the target channel 812 and the waste liquid channel 814 is 128 μm and the depth is 60 μm. When sorting droplets (droplets comprise target droplets and non-target droplets, target droplets are W/O droplets wrapped with a target, the diameter of the droplet is about 45 μm, and the target is a single cell; non-target droplets are not wrapped with a target). The flow rate of the main channel 811 is set at 20 μL/min, and the flow rate of the offset channel 813 is set at 20 μL/min. The mixed solution containing about 1 million droplets is sorted (the proportion of target droplets is about 1%), the droplet solution at the sorting droplet outlet 6 is collected, and the number of the correctly sorted droplets (i.e., target droplets) and the number of incorrectly sorted droplets (i.e., non-target droplets) are observed and counted through electron microscopy, and the ratio of correctly sorted droplets is calculated, and the result is 99.5%.

Control group: The "Y" type sorting channel in FIG. 9 is composed of a main channel 811, a target channel 812, a waste liquid channel 814 and a sorting part 815 at the intersection of each channel. The width of the main channel 811 is 54 μm and the depth is 60 μm. The width of the target channel 812 and the waste liquid channel 814 is 128 μm and the depth is 60 μm. The cross-section of sorting part 815 in the horizontal direction is irregular. The droplet sorting and the statistics are the same as those in the test group, and the ratio of correctly sorted droplets is 92.9%.

According to the test results, the sorting accuracy of the "X" type sorting channel is significantly higher than that of the "Y" type sorting channel, and the offset channel 813 can effectively prevent non-target droplets from flowing into the target channel 812 by mistake.

Example 4 Shield Electrode

The droplet sorting chip shown in FIG. 1 uses dielectrophoretic force to sort droplets. Dielectrophoresis (DEP) refers to the effect that after the particles in the fluid are subjects to a non-uniform electric field, the internal charges of the particles are induced to be polarized, thereby moving in the positive or negative direction of the electric field gradient. During the droplet sorting process, the high-voltage sorting electrode 4 will apply a non-uniform electric field, and the electric field will propagate outward with the high-voltage sorting electrode 4 as the center. If the electric field is not shielded, the range of the electric field can cover the entire chip and cause interference, for example, if the droplets are in the interference electric field before entering the sorting channel 81, a dielectrophoretic force may be generated, so that the droplets cannot be arranged one by one sequentially, and fusion or irregular arrangement may happen.

In order to avoid the influence of interfering electric field, as shown in FIG. 1, a circle of shield electrode 5 is arranged around the chip. The shield electrode 5 is a metal wire structure along the periphery of the droplet inlet 1, the spaced oil phase inlet 3, the offset oil phase inlet 2, the high-voltage sorting electrode 4, the sorting droplet outlet 6, the waste liquid outlet 7 and the channel 8. The metal wire is not closed at the head and tail, and is connected with the protective ground wire of the instrument during the use of the chip to play the role of electric field shielding.

In the prior art, when fabricating a droplet sorting chip, electrodes are first fabricated on a glass substrate, and the above-mentioned structures such as a droplet inlet and a channel are engraved on the PDMS chip, and then the glass substrate and the PDMS chip are aligned to cross-link the PDMS chip to the glass substrate. superior. This process requires precise control of the positions of the electrodes and structures such as channels on the PDMS chip, so that the distances between the electrodes and the structures on the PDMS chip are within a predetermined range. The fabrication process is complicated and the distance between the electrode and the channel and other structures is difficult to accurately control. The shield electrode provided by the present invention can directly engrave the channel where the shield electrode 5 is located on the PDMS chip, inject liquid metal into the channel, and form the shield electrode 5 after cooling and forming. Therefore, the alignment operation of the electrode and other structures can be avoided, the fabrication process is simple, and the position is controllable.

Compared with a plurality of discontinuous shield electrodes distributed on the droplet sorting chip, the shield electrode 5 of the present application is in an integrated structure, and liquid metal can be poured at one time instead of multiple times, which is more convenient for chip fabrication. The channel engraved on the PDMS is very small. When pouring liquid metal, it is necessary to accurately control the amount of droplet metal so that it can fill the channel without overflowing and causing waste or pollution. Therefore, one pouring can make the chip fabrication simple and controllable. In addition, during the use of the chip, the shield electrode 5 needs to be connected to the protective ground wire of the instrument. The shield electrode 5 with the integrated structure in this application only needs to be connected to the protective ground wire of the instrument once, which is convenient for operation; while multiple shield electrodes that are discontinuously distributed require multiple connections, which is cumbersome in operation.

In some embodiments, the channel section can be circular, semi-circular, rectangular, trapezoidal or other shapes, the depth of the channel is greater than or equal to the channel 8, and the shape of the shield electrode 5 formed by the solidification of the poured droplet metal is the same as that of the channel, with the cross-section and depth consistent with the channel.

In some embodiments, the metal can also be omitted in the channel, and a liquid salt solution (e.g., 2M NaCl) can be used directly. The use of salt solution can shield the electric field like metal, but in the actual use process, the inventor has found that: (1) if the salt solution is sealed in a channel, the salt solution is easy to dry up and difficult to encapsulate, which will increase the difficulty of operation and may affect the shielding effect; (2) if the salt solution is circulated in the channel through the pump during the use of the chip, the problems of encapsulating and drying can be avoided, but more pumps and containers need to be used, which occupies space and increases the cost. In addition, the stability of the salt solution is low, so attentions should be paid to the preparation and storage of the solution. When using metal, it is only necessary to inject liquid metal into the channel and wait for molding. There is no need for excessive operations, and the later use process is stable. Therefore, the shield electrode 5 is preferably a metal electrode.

In some embodiments, the metal electrode is an alloy of indium, tin, and zinc, and the melting point of the alloy is 40° C. to 80° C. Compared with metals with high melting points such as copper and iron, the alloy only needs to be heated to 80° C. when making to make it in a liquid state. After pouring into the channel, the cooling time is short and there is no risk of scalding.

Example 5 Droplet Sorting System

Figure 10:
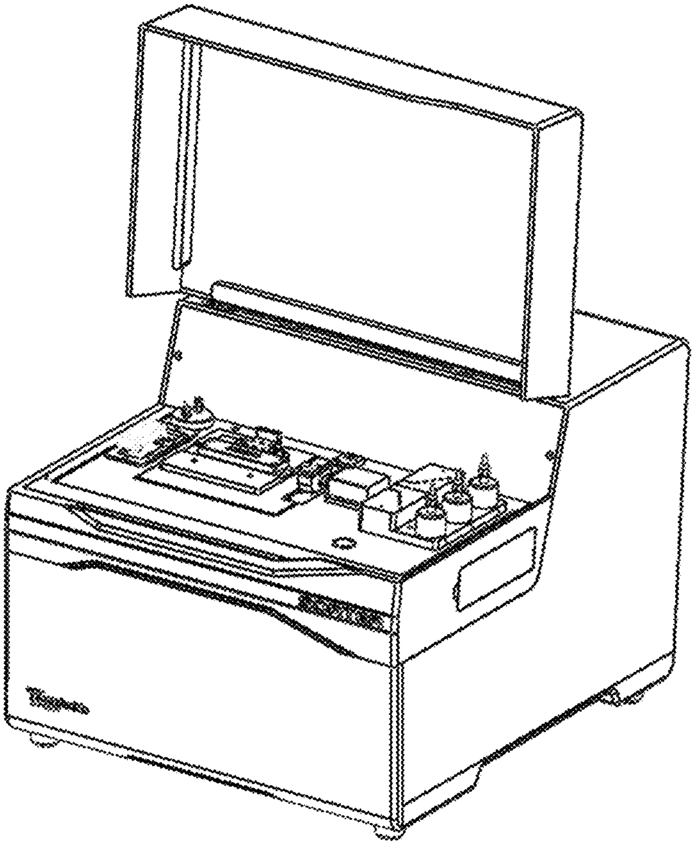
FIG. 10 is an overall schematic diagram of a droplet sorting apparatus provided by the present invention.
Figure 11:
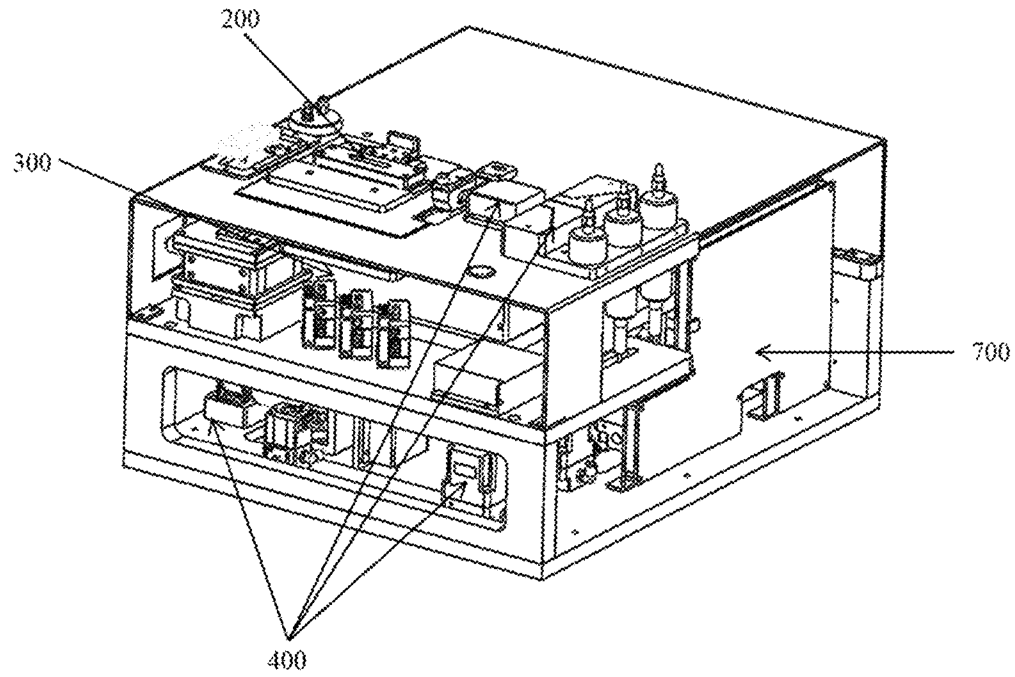
FIG. 11 is a schematic diagram of the internal structure of a droplet sorting apparatus provided in FIG. 10.
Figure 12:
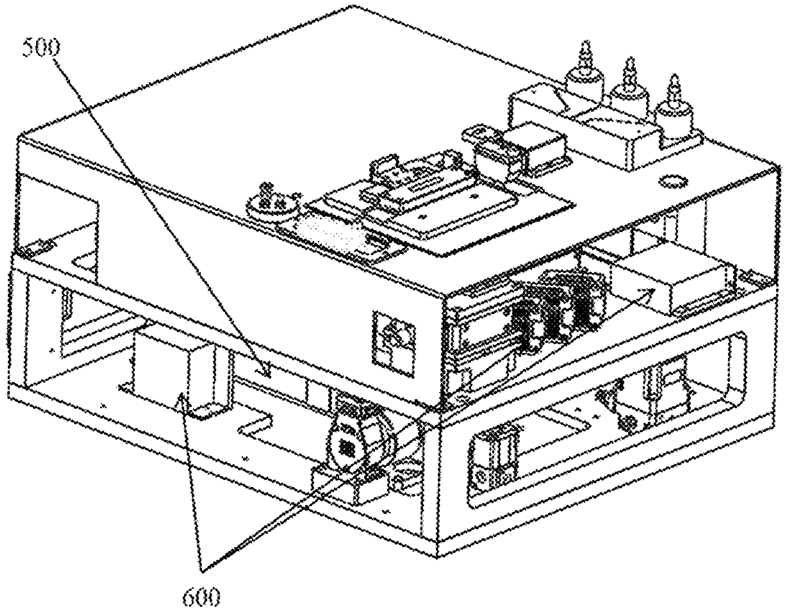
FIG. 12 is a schematic diagram of the internal structure of a droplet sorting apparatus in another direction provided in FIG. 10.

1. As shown in FIGS. 10 to 12, a droplet sorting apparatus is provided by the present invention. The droplet sorting apparatus comprises a chip module, a fluorescence module, a pump driving module, an electrode driving module, a circuit module and a monitoring module.

The chip module is used to place the droplet sorting chip. The fluorescence module is used to provide excitation light and collect fluorescence signals. The pump driving module is used to pump fluids such as mixed solution or continuous phase, including a sample pressure pump, a spaced oil pressure pump, an offset oil pressure pump and the driving and connecting devices thereof. The circuit module is used to connect various modules to conduct signal or instruction transmission.

The monitoring module is used to monitor whether the droplet sorting apparatus operates normally. The monitoring module comprises a pressure monitoring unit and an identification unit. The pressure monitoring unit is used to monitor whether the pressure of the system is normal, including the pump pressures of the sample pressure pump, the spaced oil pressure pump and the offset oil pressure pump, etc. The identification unit is used to identify whether there are correctly sorted droplets in the target channel, here the CCD camera is used, and the CCD camera can quickly take pictures and record the image data of each droplet in the target channel, and transmit the obtained data to the computer system.

2. The droplet sorting chip in FIG. 1, the droplet sorting apparatus in FIG. 10 and the computer system constitute a droplet sorting system of the present invention. The droplet sorting carried out by the system comprises the following steps:

S1, the droplet sorting chip in FIG. 1 is placed in the chip module. The parameters of each module are set through the computer system, including the flow rate of the sample pressure pump, the flow rate of the spaced oil pressure pump, the flow rate of the offset oil pressure pump, and the wavelength of the excitation light, etc.

S2. The droplet sorting process is started. The mixed solution enters the droplet sorting chip from the droplet inlet under the push of the sample pressure pump, and forms a droplet flow arranged sequentially in the main channel 811. The continuous phase is injected from the spaced oil phase inlet 3 driven by the spaced oil pressure pump, and the continuous phase merges with the droplet flow, which further makes the droplets in the droplet flow to be arranged one by one in sequence at a certain interval, and drives the droplet flow to move forward continuously. At the same time, the continuous phase is injected from the offset oil phase inlet 2 and enters the offset channel 813 driven by the offset oil pressure pump.

S3. When the droplets to be sorted arrive at the front end of the sorting part 815, they are excited by the excitation light provided by the fluorescence module. If they are target droplets, a fluorescence signal of a certain intensity will be generated. The signal is detected and amplified by the fluorescence module and converted into an electrical signal and transmitted to a computer system; the computer system determines whether the droplets to be sorted are target droplets through the received electrical signal, and if droplets are target droplets, the computer system outputs instructions to the electrode driving module, and the electrode driving module transmits high-voltage electricity to the high-voltage sorting electrode to generate a non-uniform electric field. Under the action of the non-uniform electric field, a dielectrophoretic force that acts on droplets to be sorted is generated, so that the droplets are deflected and flow to the target channel; if droplets are non-target droplets, then no fluorescence is produced, or the received fluorescence signal is below the threshold, and the computer system determines the droplets as non-target droplets, and does not issue an instruction to the electrode driving module, and the droplets to be sorted flow to the waste liquid channel. Moreover, the offset oil phase provides resistance from the target channel to the waste liquid channel, or lateral resistance that prevents non-target droplets from flowing to the target channel, which can effectively prevent non-target droplets from flowing into the target channel by mistake.

S4. The CCD camera collects the image information of the sorted droplets in the target channel and transmits the information to the computer system, and the computer system judges whether the droplets are correctly sorted.

Figure 13:
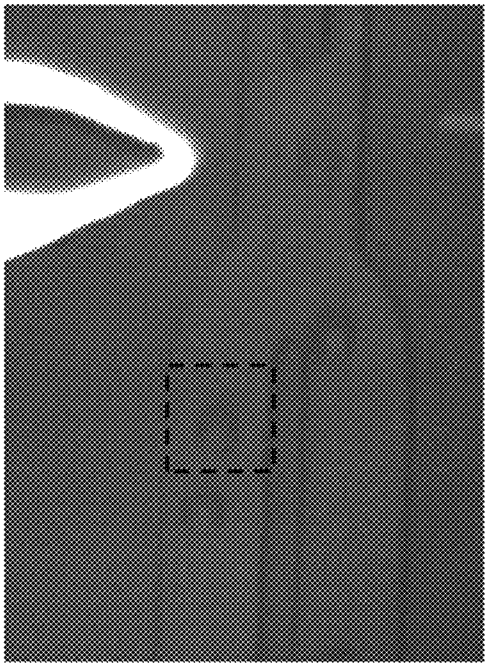
FIG. 13 is a grayscale collection image and a relation curve between grayscale and time in the collection area.
Figure 13:
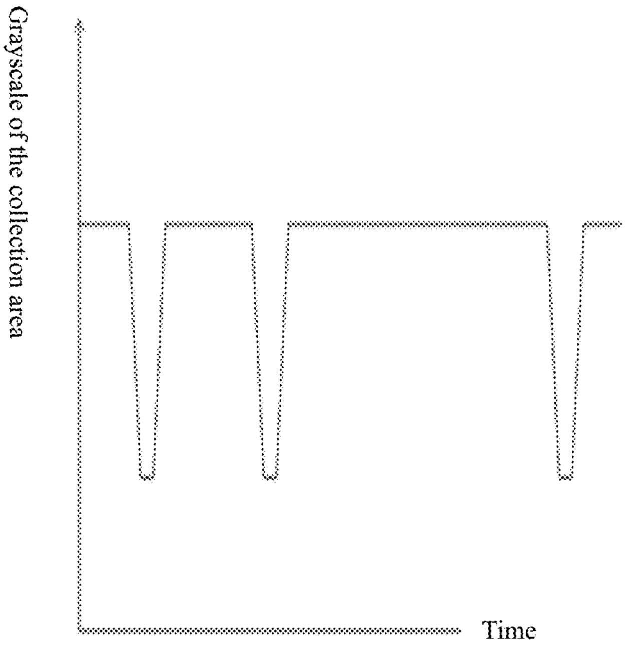

The computer system can use a grayscale comparison program to determine whether the droplets are correctly sorted. The grayscale comparison program judges whether the sorted droplet in the target channel is a correctly sorted droplet by comparing the grayscale of the sorted droplet in the target channel in the image captured by the CCD camera with the grayscale image containing the incorrectly sorted droplet or the grayscale image of the correctly sorted droplet. Generally, target contents such as cells, proteins, and microspheres are often encapsulated in the correctly sorted droplet, and its grayscale is larger than that of the incorrectly sorted droplet. For example, as shown in FIG. 13, FIG. 13*a* is a photo obtained during droplet sorting, and the grayscale comparison program can identify the grayscale in the virtual frame (collection area) of FIG. 13*a*, and can also draw the change curve of grayscale and time in the collection area (FIG. 13*b*), and judge whether a droplet is a correctly sorted droplet through grayscale comparison and change.

The computer system may also comprise a deep learning model, through the deep learning model, whether droplets are correctly sorted can be judged. The deep learning model is widely used in image recognition such as face recognition [A Review of Face Attribute Recognition Methods Based on Deep Learning, Lai Xinyu et al., Computer Research and Development, 2021, 58(12), 2760-2782], vehicle recognition [A Review of the Application of Deep Learning Image Recognition Technology in Vehicle Detection and Vehicle Recognition, Wang Ye, Artificial Intelligence and Recognition Technology, Issue 6, 2021], which can accurately identify single or multiple complex individuals in the image. Using the deep learning model, the droplets in the image can be identified to determine whether they are target droplets. Compared with the grayscale comparison method, the deep learning model can identify target droplets with different characteristics. In addition to the grayscale characteristics, information such as droplet size, color, and shape is also included, and the recognition accuracy is higher. Deep learning models comprise VggNet, ResNet, and YOLOv, etc. The present invention selects YOLOv5, and the training and application of the model comprises the following processes: ①. taking pictures of target droplets in advance to obtain the images of target droplets; ② annotating the features (including grayscale, size, and content) of the target droplets in the image; ③ inputting the annotated droplet images into YOLOv5 for training to obtain the optimal model parameters; ③ inputting the images of target droplets to the trained YOLOv5 model to verify the accuracy; ④ inputting the images obtained by the CCD camera into the trained YOLOv5 model during droplet sorting, to identify whether the droplets in the images are target droplets.

In addition, the computer system can make an early warning or stop the droplet sorting apparatus from working according to the judgment result. The computer system can also make statistics on the judgment results of the grayscale comparison program or deep learning model, for example, counting the number of correctly sorted droplets, the number of incorrectly sorted droplets, the total number of droplets, etc. that pass through the target channel, and can further calculate the ratio of the number of incorrectly sorted droplets to the total number of droplets, that is, the error rate. When the sorting error rate reaches a certain value, an early warning is issued and/or the droplet sorting process is stopped. For example, the error rate is 1%, 2%, 3%, 10%, etc. The threshold of the error rate can be set according to the purity requirements of the final collected droplets. Of course, it is also possible to issue an early warning and/or stop the droplet sorting process when an error is found or the number of incorrectly sorted droplets reaches a certain value.

The pressure monitoring unit in the droplet sorting apparatus can also detect the pressure everywhere in the system, and transmit the pressure information to the computer system, and the computer system records and displays the pressure value. The safe range of pressure can be set in the computer system, and when the pressure value exceeds the range, an early warning can also be issued or the droplet sorting apparatus can be stopped. When the droplet sorting system works abnormally, the pressure value recorded by the computer system can also be used as reference data for identifying the causes of the failure.

The invention claimed is:

1. A droplet sorting chip, comprising a cavity area, wherein the cavity area is configured to accommodate impurities that enter into the droplet sorting chip;

wherein the chip further comprises an injection port, the injection port is configured to inject a mixed solution, the mixed solution comprises a droplet and a continuous phase, the cavity area is located downstream of the injection port and is configured to be in fluid communication with the injection port;

wherein the chip comprises a sieve structure, and the sieve structure is located downstream of the injection port, the mixed solution can enter the sieve structure through the injection port;

wherein an end of the sieve structure close to the injection port is configured to form an angular shape, and a periphery of the angular shape is configured to form the cavity area, and an end point of the angular shape is configured to face the injection port, thereby forming an arrangement between the sieve structure, the cavity area and the injection port;

wherein the above arrangement between the sieve structure, the injection port and the cavity area is configured to actively reduce an amount of impurity clogging in the chip.

2. The chip according to claim 1, wherein the injection port is directly connected to the cavity area.

3. The chip according to claim 2, wherein the cavity area is located on both sides of the injection port.

4. The chip according to claim 1, wherein the sieve structure comprises cylinders and pores, the cylinders are arranged at intervals to form the pores; the pores are configured for the passage of the droplets.

5. The chip according to claim 1, wherein the cavity area is located at the top end of the chip in the depth direction.

6. The chip according to claim 1, wherein the cavity area is located at the bottom end of the chip in the depth direction.

7. The chip according to claim 1, wherein the impurities comprise fibers, dust and glass fragments.

8. The chip according to claim 1, wherein the chip further comprises a droplet inlet, a spaced oil phase inlet, an offset oil phase inlet, a sorted droplet outlet, a waste liquid outlet and a channel, and the cavity area is located at the droplet inlet.

9. The chip according to claim 8, wherein the channel comprises a sorting channel, and the sorting channel comprises a main channel, a target channel, an offset channel, a waste liquid channel, and a sorting part; the main channel, the target channel, the offset channel, and the waste liquid channel intersect at the sorting part; the main channel and the offset channel are located upstream of the sorting channel, and the offset channel and waste liquid channel are located downstream of the sorting channel.

10. The chip according to claim 9, wherein the main channel is used for passing a mixed solution, and the mixed solution comprises target droplets and a continuous phase.

11. The chip according to claim 10, wherein the offset channel is configured to pass fluid through and generate lateral resistance;

the direction of the lateral resistance is from the offset channel side to the main channel side, which is further configured to prevent non-target droplets from entering a target channel from the main channel after passing through the sorting part.

12. The chip according to claim 9, wherein the main channel and the offset channel are parallel to each other and have the same size.

13. The chip according to claim 12, wherein the fluid entering the offset channel is a continuous phase, and the flow rate of the continuous phase in the offset channel is less than or equal to the flow rate of the mixed solution in the main channel.

14. The chip according to claim 13, wherein the offset channel and the main channel form a certain angle, and the angle is 0° to 90°.

15. The chip according to claim 9, wherein the chip further comprises a high-voltage sorting electrode, the high-voltage sorting electrode is configured to conduct electricity, generate a non-uniform electric field, and deflect target droplets to the target channel under the action of a dielectrophoretic force.

16. The chip according to claim 9, wherein a shield electrode is provided configured on the periphery of the chip.

17. The chip according to claim 9, wherein the chip comprises a spaced oil phase inlet and an offset oil phase inlet, the spaced oil phase inlet is configured to pump a continuous phase into the main channel, and the offset oil phase inlet is configured to pump fluid into the offset channel.

* * * * *